United States Patent [19]

Kluppel et al.

[11] Patent Number: 4,720,244
[45] Date of Patent: Jan. 19, 1988

[54] FAN BLADE FOR AN AXIAL FLOW FAN AND METHOD OF FORMING SAME

[75] Inventors: George E. Kluppel, Richmond; Robert C. Monroe, Houston, both of Tex.

[73] Assignee: Hudson Products Corporation, Houston, Tex.

[21] Appl. No.: 53,074

[22] Filed: May 21, 1987

[51] Int. Cl.$^4$ .................................................. F01D 5/14
[52] U.S. Cl. .................................. 416/224; 416/229 R; 416/230; 416/232; 416/241 A; 416/241 B
[58] Field of Search ............... 416/229 A, 229 R, 230, 416/232, 241 A, 241 B, 224, 226; 428/156.8 H; 264/251, 258, 313, 314, DIG. 53

[56] References Cited

U.S. PATENT DOCUMENTS

| | | | |
|---|---|---|---|
| 3,588,267 | 6/1971 | Wilkinson et al. | 416/190 |
| 4,318,672 | 3/1982 | Hansen | 416/229 A |
| 4,594,761 | 6/1986 | Murphey et al. | 416/229 R |
| 4,648,921 | 3/1987 | Nutter, Jr. | 416/229 R |
| 4,690,860 | 9/1987 | Radvan et al. | 264/257 |

Primary Examiner—Robert E. Garrett
Assistant Examiner—Therese Newholm
Attorney, Agent, or Firm—Vaden, Eickenroht, Thompson & Boulware

[57] ABSTRACT

There are disclosed a blade for use as part of an axial flow fan and a method of forming such a blade wherein a large concentration of silica particles are molded into the leading edge of a hollow, one-piece molded body which includes a core of reinforced, thermosetting resin having relatively low abrasion resistance.

14 Claims, 7 Drawing Figures

FAN BLADE FOR AN AXIAL FLOW FAN AND METHOD OF FORMING SAME

This invention relates generally to fan blades for axial flow fans and a method of forming same. More particularly, it relates to improvements in hollow, one-piece reinforced plastic fan blade bodies for fans to be used in heat exchangers, and especially cooling towers or other environments where water particles are entrained in the air flowing through the fan, and to a method of forming the bodies of such fan blades wherein a thermosetting resin is injected under pressure into a closed space between a flexible bag and a rigid, outer mold conforming to the outer configuration of the body so as to impregnate the reinforcement arranged within the space, and fluid is supplied to the bag under pressure as the resin is maintained at a temperature to cure it and thereby mold the body as one piece.

Fans of this general type, which have been made for many years by the assignee of the present application, may be as much as thirty feet in diameter. In the described environment, the tips of the blades may rotate at speeds as high as 135 mph. The hollow, reinforced plastic construction of the blades makes them light in weight and resistant to corrosion, but nevertheless quite strong and thus capable of sustaining the heavy loads imposed on them by the air passing through them. Also, of course, they are easily molded to complex configurations of varying curvature from their inner ends to their outer ends and between their leading and trailing edges.

Early blades of this type included reduced tubular necks at their inner ends for connection to the hub of the fan and molded as one piece with a thin, wide body having leading and trailing edges and tapering from its inner to its outer end. The blades were formed by containing fiberglass cloth in a space between a flexible bag and a rigid, outer mold conforming to the outer configuration of the blade to be formed, and adding epoxy resin to the space through the open upper end of the mold as the mold was held with its neck uppermost as to impregnate the fiberglass. Fluid under pressure was supplied to the bag to cause the resin to flow uniformly within the fiberglass within the space, and the resin was cured by heating of the mold under controlled temperature conditions.

Due to the abrupt transition between the neck and the wide body of the blade, there was a tendency for this area of the blade to be resin rich, resulting in cracks which had to be repaired. There was also a tendency for the areas of the blade body adjacent its leading and trailing edges to be resin rich, and, in an attempt to more evenly distribute the resin, spreaders were passed through the neck of the bag and expanded into the wide portion thereof opposite the leading and trailing edges of the core of reinforcing material. However, the necessity of expanding the spreaders limited the force which they could exert for this purpose.

This forming method was slow and labor intensive, due at least in part to the gravity flow of resin into and through the mold space and the need for inserting and then removing the spreader in the course of molding of each blade. Also, the epoxy resin was difficult and time consuming to handle, requiring precise control during curing. For these and other reasons, this early method of forming blades of this type was not well suited to mass production techniques.

More recently, the assignee of the present application has made and sold a fan blade of this type having a composite construction including an inner neck portion adapted to connect to the hub and a body having a wide, open inner end to receive a relatively flat outer end of the neck portion for connection thereto. More particularly, the body is tapered from its wide inner end to a narrower tip at its outer end and the bag is of such shape that a rigid form could be easily moved into and out of a position in the bag in which its side edges held its side edges close to the side edges of the outer mold. Thus, it was possible to avoid the resin rich areas which were encountered in the transition area as well as along the leading and trailing edges of the body of the prior blade.

To further reduce the time involved in forming the blades, the epoxy resin was replaced by vinyl-ester or polyester resins, which are much easier to handle and quicker to cure than epoxy. The method of forming the blades was also more automated and avoided dangerous emissions, in that the resin was pumped under pressure into a closed space between the bag and outer mold in which the fiberglass was contained in order to more rapidly and uniformly impregnate the fiberglass.

When used in a wet cooling tower, the leading edges of the fan blades are subject to much more erosion due to the water particles in the air than they encounter when used in the dry environment of an air-cooled heat exchanger. This did not present structural problems in the case of the earlier blades because, as previously mentioned, their leading edges were resin rich. Hence, although erosion might have interfered with the aerodynamic characteristics of the fan, and possibly upset the weight balance of the blades, the blades would presumably maintain their structural integrity throughout their expected lives.

However, although preferred for reasons also previously noted, vinyl-ester and polyester resins are much less abrasion resistant than epoxy resin. This, combined with their thinner leading edges was thought to risk structural failure of the blade in a much shorter time span than its expected life. The addition of protective covering to the leading edges of the blades, such as rubber boots, was not found practical, because, for one thing, they added considerably to the weight and mass of the blades, thus requiring greater energy to operate the fan as well as upsetting the aerodynamic balance of the fan and causing vibrations.

It has also been demonstrated that the wear resistance of a resin-fiberglass matrix may be improved by the addition of silica to the resin. Moreover, the resistance to wear increases with larger concentrations of silica, the best results being reached with a silica content of about forty (40) percent. However, a relatively low viscosity resin such as vinyl-ester or polyester is difficult to pump, even with a substantially lesser silica content. Hence, this was not a viable option in rendering the fan blades more abrasion resistant.

It is therefore the primary object of this invention to provide a fan blade of this latter type, having a highly abrasion resistant leading edge which is an internal part of the blade body, and capable of being formed in accordance with the above described automated procedures.

Another object is to provide such a blade and a method for forming same which requires very little more time, preparation and expense than the blade and forming method above described, and further to provide such a blade which is neither substantially larger nor substantially heavier than the prior blade.

These and other objects are accomplished, in accordance with the illustrative embodiments of the present invention to be described in detail below, by a fan blade which comprises a hollow, one-piece molded body having leading and trailing edges and including a core of reinforced, thermosetting resin having relatively low abrasion resistance and a large concentration of silica particles molded into the body along only the leading edge thereof. In forming the blade, the silica particles are arranged along only the leading edge of the reinforcing material and contained therewith within a closed space between a flexible bag and a rigid mold conforming to the outer configuration of the blade body to be formed. A thermosetting resin having relatively low abrasion resistance is then injected into the mold space so as to impregnate the reinforcement, and fluid pressure is applied to the inside of the bag while maintaining the resin at a temperature which cures the resin and molds the silica particles. Thus, the blade body is formed by a molding technique basically similar to that carried out in forming the above described blades whose leading edges are instead highly susceptible to abrasion, the advantages of these molding techniques may be retained without substantially more time and effort than was involved in the formation of the prior blades. More particularly, the resulting blade is neither substantially larger nor heavier than the prior blade, and yet has a leading edge which is rendered abrasion resistant without the addition of boots or the like to the finished blade.

In accordance with the preferred embodiment of the invention, these silica particles are molded within the thermosetting resin along with the reinforcement. More particularly, the reinforcement is in the form of fiberglass cloth, and the silica particles are carried within a layer of felt which is folded over the fiberglass cloth along the leading edge of the body. The thermosetting resin is selected from a group consisting of vinyl-ester and polyester which, as previously noted, are easily and quickly cured as compared with epoxy resin.

In accordance with an alternative, but less preferred, embodiment of the invention, the silica particles are instead contained within another thermosetting resin which is molded to the core of reinforcement and the first-mentioned resin with the use of a suitable catalyst compatible with the catalyst added to the resin of the core. More particularly, the silica particles are carried within a cloth-like material which is impregnated with the other resin prior and then folded over along the leading edge of the reinforcement, as in the preferred method. The resin is partially cured so as to permit it to be arranged along the leading edge of the reinforcing material in a dry state, and is preferably an epoxy resin which, in addition to being compatible with the resin of the core, has relatively high resistance to abrasion, thereby adding to the overall abrasion resistance of the leading edge of the blade.

In the drawings, wherein like reference characters are used throughout to designate like parts:

Figure 1:
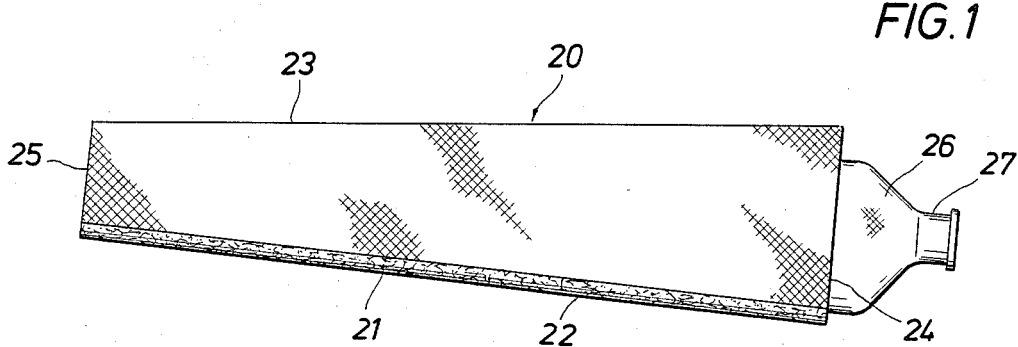
FIG. 1 is a top plan view of a fan blade including a body connected to a neck portion for mounting on a hub and having a large concentration of silica particles molded into the body along only its leading edge.

With reference now to the details of the above-described drawings, and as shown in FIG. 1, the overall blade, which is indicated in its entirety by reference character 20, includes a thin body 21 having a leading edge 22 and a trailing edge 23 and tapering from a wide inner end 24 to a relatively narrow outer end 25. As previously described, the body 21 of the blade is hollow and open at its inner end 24 so as to receive the outer end of a neck portion 26 for connection thereto in order to mount the blade on the hub of an axial flow fan. More particularly, and as shown in FIG. 1, the neck portion 26 has an inner tubular end 27 adapted to be clamped to the hub and a thin outer end which fits closely within the thin open inner end 24 of the body. Preferably, the neck portion 26 is a molded reinforced plastic body formed by injecting resin into a space between an inner mold and a rigid outer mold in order to impregnate a fiberglass core therein, in much the same manner described above in connection with formation of the body of the prior blade.

As shown in FIGS. 2 to 6, the outer mold in which the blade portion is formed comprises upper and lower portions 28 and 29 formed of any suitable rigid material capable of sustaining the heat and pressures involved in the molding process. The inner concave surfaces of the mold portions conform to the outer configuration of the blade body to be formed and have flat surfaces along their sides and outer end which are adapted to be engaged and sealed with respect to one another when the outer mold is closed. As will be understood, the outer mold members may be held in assembled position by any suitable means and, for this purpose, may have eyes on their opposite side to receive suitable connecting elements.

Figure 2:
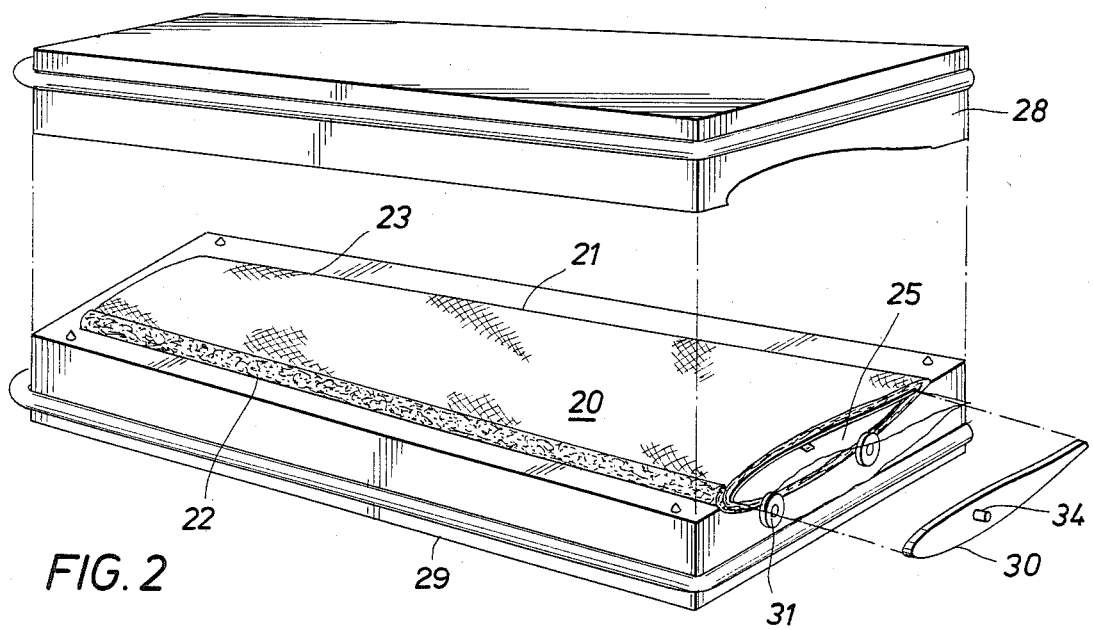
FIG. 2 is a view showing the blade body on an enlarged scale and in the process of being removed from between the upper and lower portions of the outer mold.
Figure 6:
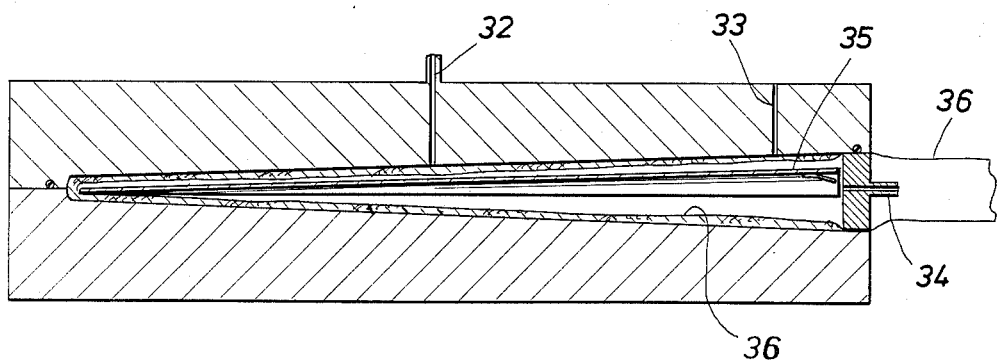
FIG. 6 is a longitudinal sectional view of the outer mold on a reduced scale and showing the reinforcement and silica particles arranged therein.
Figure 7:
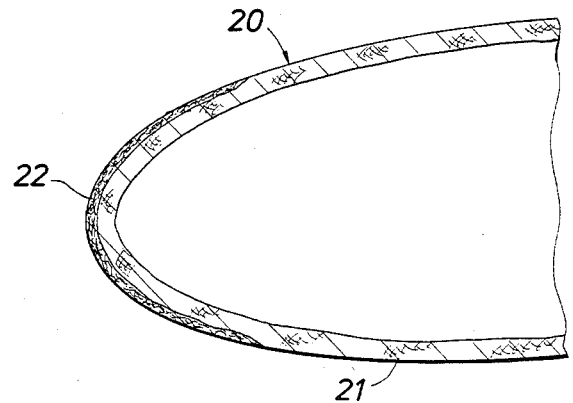
FIG. 7 is an enlarged, cross-sectional view of the leading edge of the blade body.

As shown in FIG. 2, the inner end of the mold is open so as to permit the molded blade body to be removed therefrom. However, during a molding cycle, and following closing of the mold about the fiberglass lay up and silica particles, as will be described, a cover plate 30 fits closely within the outer end portion of a flexible bag 36 about which the fiberglass is laid in order to close the outer mold (FIG. 6). The cover is adapted to be releasably held in closed position by fasteners 31 or the like so as to completely close the mold.

Figure 3:
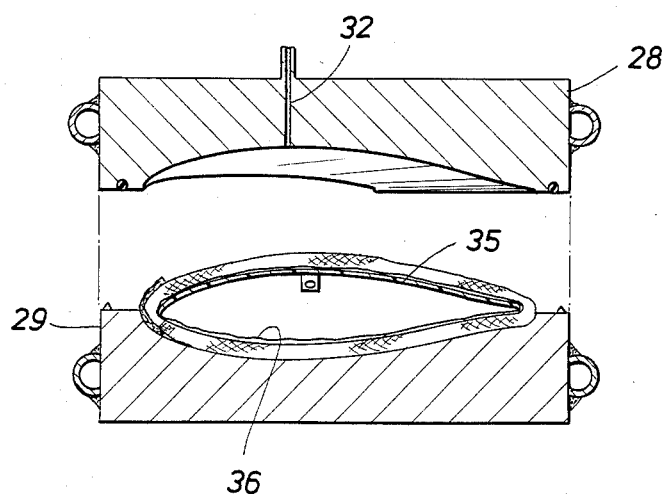
FIG. 3 is cross-sectional view of the blade body and upper and lower portions of the mold shown in FIG. 2.
Figure 4:
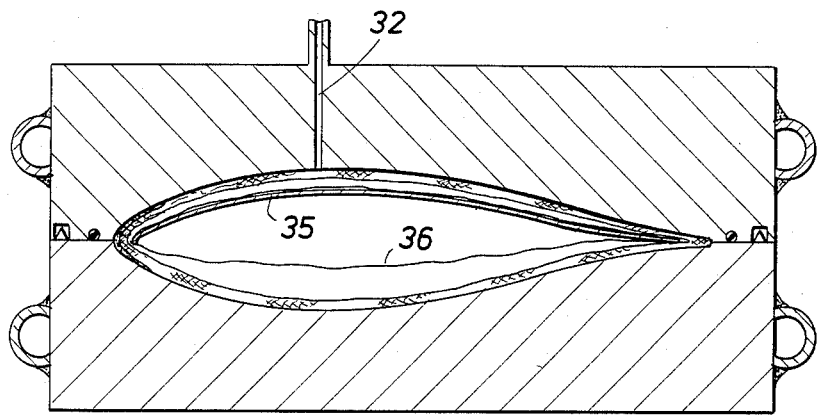
FIG. 4 is a cross-sectional view of the outer mold with the upper portion lowered onto the lower portion in order to contain the fiberglass reinforcement and layer of felt-like material containing the silica particles and showing a substantially rigid spreader within the flexible bag about which the fiberglass is arranged.
Figure 5:
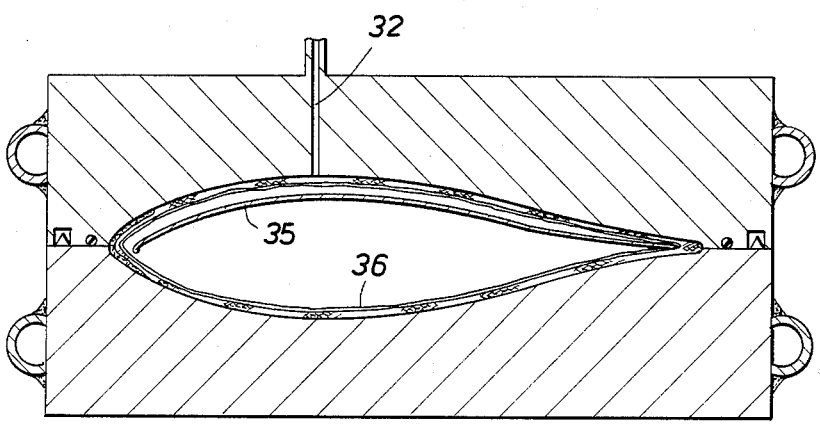
FIG. 5 is a view similar to FIG. 4, but upon the injection of resin into the mold so as to impregnate the reinforcement, and further upon the introduction of fluid under pressure into the flexible bag so as to expand it and thus compress the impregnated fiberglass.

The flexible bag is made of any suitable plastic material of such size as to permit it to be disposed within the outer mold to form a space between in which core of fiberglass and the silica particles are received. More particularly, the bag is closed at its outer end and is held outwardly along its side edges by a spreader 35 of metal or other relatively rigid material. Thus, as shown in FIGS. 3, 4 and 5, the spreader is of a width approximating the desired width of the inside of the molded blade body, so that when disposed within the bag, its opposite side edges hold the sides of the bag close to the opposite sides of the inner surface of the outer mold. More particularly, the spreader extends from one end to the other of the portion of the bag within the outer mold and thus the blade body to be molded. The cover plate 30 is shown in FIG. 6 to have been moved into the open end of the bag so as to close the outer end of the mold within the bag, so that, when held in place by the fasteners 31, the cover 30 defines the inner end of the space between the bag and the outer mold.

The upper mold member 28 has one or more ports 32 therein which lead to the space between the outer mold and the bag and thus permit the resin to be injected into the space. As shown in FIG. 6, another port 33 in the upper mold member provides a vent for air which is forced from the annular space during the injection of the resin. FIG. 6 also shows a port 34 formed in the cover 30 so as to permit air or other fluid to be supplied to the bag under pressure during the molding process.

In the formation of the blade, fiberglass cloth is laid up about the flexible bag with the spreader 35 therein to a generally uniform thickness. In accordance with the preferred embodiment of the invention, the silica particles are arranged along only the leading edge of the layup of fiberglass in the form of a felt-like material adapted to be folded over the edge. More particularly, the felt is a commercially available material known as Kaowool "Ultrafelt" and manufactured and sold by the Insulating Products Division of Babcock and Wilcox, primarily for heat insulating purposes and containing a random arrangement of approximately 52% silica and 48% alumina fibers. Although this particular material has been found to provide an excellent carrier for the silica particles, it will be understood that the silica particles may be provided in other forms which, like that described requires no preparation and may be folded over the leading edge of the layup of fiberglass in dry form.

As previously described, and following the disposal of the cover 30 over the open end of the outer mold, the fiberglass layup is impregnated with either vinyl-ester or polyester resin which is pumped through the ports 32. As the resin is pumped into the space, the carrier which holds the silica particles in place will also be impregnated to impregnate the fiberglass layup, so that the silica particles are molded as part of the core made up of the fiberglass and resin. The silica particles have been found to "wet" very well by the resin, and thus provides a smooth outer surface of the leading edge of the blade body, and their random arrangement is believed to minimize the possibility of channeling of openings or pits which might form in the leading edge due to abrasion.

After the resin has been injected and caused to fully impregnate the fiberglass layup and silica particles, air or other fluid is supplied under pressure to the inside of the bag so as to compress the layup and thus more uniformly distribute the resin throughout it. During this time, of course, any air captured in the resin is free to escape through the port 33 in the upper mold member. As pressure is supplied and held on the inner surface of the blade body to be molded, the mold is raised to a suitable temperature for curing purposes. Of course, curing could be accelerated by the addition of a suitable catalyst to the resin.

As previously mentioned, and in accordance with an alternative but less preferred embodiment of the invention, silica particles in the form of flour are mixed with another resin and applied in liquid form to the leading edge of the fiberglass layup. More particularly, the resin is one which, through use of suitable catalysts, can be cured along with the vinyl ester or polyester and thus molded to the core and thus into the leading edge of the blade body in the formation of the blade. Epoxy resin has been found to have this characteristic and is well suited for use in the formation of the blade because of its toughness and resistance to abrasion.

Preferably, however, the silica particles are carried by a pre-impregnated tape of inert material which may be folded over the leading edge of the fiberglass lay up. More particularly, the resin is preferably first partially cured so that it, like the fiberglass, is dry during lay up. Although preferable to the wet lay up from the standpoint of handling, the pre-impregnated tape nevertheless requires special attention to prevent it from self-curing, and thus is not as easy to use as the felt-like material previously described.

From the foregoing it will be seen that this invention is one well adapted to attain all of the ends and objects hereinabove set forth, together with other advantages which are obvious and which are inherent to the fan blade for an axial flow fan and the method of making same.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. For use as part of an axial flow fan, a blade comprising
 a hollow, one-piece molded body having leading and trailing edges and including a core of reinforced, thermosetting resin having relatively low abrasive resistance, and a large concentration of silica particles molded into the body along only its leading edge.

2. A fan blade of the character defined in claim 1, wherein
 the silica particles are molded within the thermosetting resin along with said reinforcement.

3. A fan blade of the character defined in claim 2, wherein
 said reinforcement is in the form of fiberglass cloth, and
 said silica particles are carried within a layer of felt which is folded over the fiberglass cloth along the leading edge of the body.

4. A fan blade of the character defined in claim 3, wherein
 the thermosetting resin is selected from a group consisting of vinyl ester and polyester.

5. A fan blade of the character defined in claim 1, wherein the silica particles are contained within another thermosetting resin which has relatively high abrasion resistance and which is bonded to the thermosetting resin of the core.

6. A fan blade of the character defined in claim 5, wherein
the silica particles are carried within a cloth-like material impregnated with the other resin.

7. A fan blade of the character defined in claim 5, wherein
the first resin is selected from vinyl-ester and polyester, and
the other resin is epoxy.

8. In a method of forming a hollow, one-piece reinforced plastic fan blade body having leading and trailing edges and adapted for use in an axial flow fan, the steps of
arranging a large concentration of silica particles along the portion of the core which is to form the leading edge of the body,
containing the reinforcement and silica particles within a closed space between a flexible bag and a rigid outer mold conforming to the outer configuration of the body,
injecting a thermosetting resin having relatively low abrasion resistance into the space to impregnate the reinforcement, and
applying fluid pressure to the inside of the bag while maintaining the resin at a temperature which cures the resin and molds the silica particles into the leading edge of the body.

9. In a method of the character defined in claim 8, the further step
of molding the silica particles within the resin along with the reinforcement.

10. In a method of the character defined in claim 9, the further steps of
laying up the reinforcement in cloth form, and
arranging a layer of cloth-like material containing the particles along the leading edge of the cloth.

11. In a method of the character defined in claim 10, wherein
the thermosetting resin is selected from a group consisting of vinyl-ester and polyester.

12. In a method of the character defined in claim 8, the further step of
containing the silica particles within another thermosetting resin which is molded to the core of reinforcement and first mentioned resin.

13. In a method of the character defined in claim 12, wherein
carrying the silica particles within a cloth-like material which is impregnated with the other resin.

14. In a method of the character defined in claim 12, wherein
the first resin is selected from a group consisting of vinyl-ester and polyester, and
the other resin is epoxy.

* * * * *